United States Patent [19]
Asahina et al.

[11] Patent Number: 6,111,048
[45] Date of Patent: Aug. 29, 2000

[54] BLOCKED POLYISOCYANATE AND USES THEREOF

[75] Inventors: Yoshiyuki Asahina; Taketoshi Usui, both of Nobeoka, Japan

[73] Assignee: Asahi Kasei Kogyo Kabushiki Kaisha, Osaka, Japan

[21] Appl. No.: 09/077,700

[22] PCT Filed: Dec. 4, 1996

[86] PCT No.: PCT/JP96/03539

§ 371 Date: May 27, 1998

§ 102(e) Date: May 27, 1998

[87] PCT Pub. No.: WO97/31961

PCT Pub. Date: Sep. 4, 1997

[30] Foreign Application Priority Data

Feb. 28, 1996 [JP] Japan .................................. 8-065172

[51] Int. Cl.$^7$ .................................................. C08G 18/80
[52] U.S. Cl. ........................... 528/45; 524/270; 524/284; 524/414; 524/589; 524/590; 524/710; 524/773; 524/775; 528/76; 528/85; 560/25; 560/26; 560/158; 252/182.22
[58] Field of Search .................................. 528/45, 76, 85; 524/270, 284, 414, 589, 590, 710, 773, 775; 560/25, 26, 158; 252/182.22

[56] References Cited

U.S. PATENT DOCUMENTS

| | | |
|---|---|---|
| 4,057,978 | 11/1977 | Sato . |
| 4,076,520 | 2/1978 | Pietsch . |
| 4,165,978 | 8/1979 | Sanzenbacher . |
| 4,433,017 | 2/1984 | Goto et al. ................................ 528/45 |
| 5,130,402 | 7/1992 | Akiyama et al. ......................... 528/45 |
| 5,232,988 | 8/1993 | Venham et al. .......................... 525/124 |
| 5,331,078 | 7/1994 | Gras et al. ................................ 528/45 |

FOREIGN PATENT DOCUMENTS

| | | |
|---|---|---|
| 1215666 | 4/1960 | France . |
| 58-49770 | 3/1983 | Japan . |
| 59-170213 | 9/1984 | Japan . |
| 2-132116 | 5/1990 | Japan . |
| 5-310884 | 11/1993 | Japan . |
| 6-293878 | 10/1994 | Japan . |
| 7-304724 | 11/1995 | Japan . |
| WO 95/32231 | 11/1995 | Japan . |
| 8-165326 | 6/1996 | Japan . |
| 994890 | 6/1965 | United Kingdom . |

OTHER PUBLICATIONS

Patent Abstracts of Japan, vol. 9, No. 21 (C–263), Jan. 29, 1985 Abstract of JP 59170213.

*Primary Examiner*—John M. Cooney, Jr.
*Attorney, Agent, or Firm*—Pennie & Edmonds LLP

[57] ABSTRACT

Disclosed is a novel blocked polyisocyanate obtained by blocking the terminal isocyanate groups of a non-blocked polyisocyanate with a thermally dissociative blocking agent, wherein the non-blocked polyisocyanate is obtained by reacting at least one diisocyanate selected from the group consisting of an aliphatic diisocyanate and an alicyclic diisocyanate with a polyhydroxy compound having an average number of hydroxyl groups as many as 4.5 to 10, and removing substantially all unreacted diisocyanate monomers. A coating composition comprising the blocked polyisocyanate of the present invention as a curing agent and a polyol as a main agent not only has excellent curability even under low temperature conditions, but is also capable of forming a coating which has excellent impact resistance. The blocked polyisocyanate of the present invention has excellent miscibility with a plasticizer for the blocked polyisocyanate, so that, an adhesive property-imparting composition comprising the blocked polyisocyanate and a plasticizer and/or a solvent can be combined with a plastisol to prepare a plastisol composition having excellent adhesive properties even under low temperature conditions.

11 Claims, No Drawings

BLOCKED POLYISOCYANATE AND USES THEREOF

BACKGROUND OF THE INVENTION

1. Field of The Invention

The present invention relates to a novel blocked polyisocyanate and use thereof. More particularly, the present invention is concerned with a novel blocked polyisocyanate obtained by blocking the terminal isocyanate groups of a non-blocked polyisocyanate with a thermally dissociative blocking agent, wherein the non-blocked polyisocyanate is obtained by reacting at least one diisocyanate selected from the group consisting of an aliphatic diisocyanate and an alicyclic diisocyanate with a polyhydroxy compound having an average number of hydroxyl groups as many as 4.5 to 10, and removing substantially all unreacted diisocyanate monomers; and is also concerned with use of the blocked polyisocyanate.

The use of the blocked polyisocyanate of the present invention includes, for example, a coating composition comprising a polyol as a main agent and the blocked polyisocyanate as a curing agent; an adhesive property-imparting composition comprising the blocked polyisocyanate, and a plasticizer and/or a solvent which are/is for the blocked polyisocyanate; and a plastisol composition comprising a plastisol (which is a dispersion of a vinyl chloride polymer in a plasticizer) and the adhesive property-imparting composition. The coating composition comprising the blocked polyisocyanate of the present invention as a curing agent has not only excellent curability even under low temperature conditions, but also is capable of forming a coating which has excellent impact resistance. Therefore, the coating composition of the present invention can be advantageously used for coating a metallic substrate (such as a steel plate or a surface-treated steel plate) and a plastic substrate, by the technique of roll coating, curtain flow coating or the like. Especially, the coating composition of the present invention is useful as materials for undercoating, top coating and intercoating various substrates; a coating material for a precoated metal including a rust-resistant steel plate; and a coating material for imparting fine appearance, weatherability, acid resistance, rust resistance, mechanical strength (such as chipping resistance and impact resistance) and the like to automobiles. The blocked polyisocyanate of the present invention has excellent miscibility with a plasticizer for the blocked polyisocyanate, so that, an adhesive property-imparting composition comprising the blocked polyisocyanate and a plasticizer and/or a solvent, can be combined with a plastisol to prepare a plastisol composition having excellent adhesive properties under low temperature conditions. This plastisol composition can be advantageously used, for example, as sealants, materials for forming an undercoating and a chip-resistant coating, and a material for the preparation of a PVC-coated steel plate in the fields of automobiles, wherein the plastisol composition is applied to by the technique of spraying, brushing or the like.

2. Prior Art

Energy-saving and the prevention of air pollution are important tasks in the field of coating. In this field, it has been desired to diversify and improve the functions of coating compositions and plastisols.

A blocked polyisocyanate, which is obtained by blocking the terminal isocyanate groups of a non-blocked polyisocyanate derived from an aliphatic and/or an alicyclic diisocyanate with a blocking agent, is stable at ambient temperature. However, upon heating the blocked polyisocyanate, the blocking groups dissociate from the terminal isocyanate groups of the blocked polyisocyanate, and the resultant deblocked polyisocyanate can serve as a curing agent for a polyol. In view of the above-mentioned properties, the blocked polyisocyanate has been expected to be a promising curing agent being capable of changing the type of a polyurethane coating composition from a two-pack type to a one-pack type, wherein the polyurethane coating composition comprises a polyol as a main agent and the blocked polyisocyanate as a curing agent, and is capable of providing a coating having excellent properties, such as chemical resistance, flexibility and weatherability. However, with respect to the blocked polyisocyanate, it has been still desired to improve the properties thereof, so as to not only solve the above-mentioned tasks, but also diversify and improve the function thereof.

With respect to the blocked polyisocyanate, which has conventionally been used as a curing agent for a one-pack polyurethane coating composition, it is necessary to heat the coating composition to high temperatures for releasing a blocking agent from the terminal isocyanate groups of the blocked polyisocyanate so as for the polyisocyanate to function as a curing agent. For example, when a coating is formed by baking from a one-pack polyurethane coating composition comprising a polyol as a main agent and a blocked polyisocyanate as a curing agent, the baking must be conducted at a temperature as high as 150 to 200° C. Such a high baking temperature is disadvantageous in that not only does it take a high cost to conduct the baking, but also a problem of air pollution is caused due to the high temperature baking. Such high baking temperatures cause difficult problems. For example, when a substrate having a low heat distortion temperature (such as a plastic) is coated with the above-mentioned coating composition, a special jig device needs to be generally used in the baking procedure for preventing the heat distortion of the substrate; however, in some cases, even such a special jig device is not useful in the baking procedure.

Thus, the use of the conventional blocked polyisocyanate has been limited, and it has earnestly been desired to develop a novel blocked polyisocyanate which can function as a curing agent for a polyol even under relatively low temperature conditions such that the above-mentioned problems are not caused, that is, a temperature as low as 110 to 130° C. (which is frequently desirable from a practical point of view).

In these situations, several proposals have been made for lowering the baking temperature necessary for curing the above-mentioned coating composition, that is, for imparting the coating composition with a curability under relatively low temperature conditions (hereinafter, frequently referred to simply as "low temperature curability"). For example, for imparting a low temperature curability to a coating composition there are some proposals of improving a curing accelerator which is generally contained in the coating composition. As an improved curing accelerator, for example, Examined Japanese Patent Application Publication No. 44-18877, Unexamined Japanese Patent Application Laid-Open Specification No. 53-138434, Unexamined Japanese Patent Application Laid-Open Specification No. 56-84714 (corresponding to G.B. Patent No. 2065151) and Unexamined Japanese Patent Application Laid-Open Specification No. 57-8217 (corresponding to G.B. Patent No. 2065151) disclose an organotin compound; Unexamined Japanese Patent Application Laid-Open Specification No. 62-199609 discloses a lead compound, an inorganic zinc compound or a mixture thereof; and Unexamined Japanese Patent Application Laid-Open Specification No. 2-199112 discloses a mixture of an organotin compound and at least one compound selected from the group consisting of a cobalt compound, a nickel compound and a zinc compound. However, a desired low temperature curability of the coating composition cannot be achieved by improving only a curing accelerator.

As an alternative measure for imparting a low temperature curability to a urethane coating composition, there have been some proposals of using an improved blocking agent for a non-blocked polyisocyanate. As an improved blocking agent, for example, Unexamined Japanese Patent Application Laid-Open Specification No. 60-149572 discloses an alkyl acetoacetate, Unexamined Japanese Patent Application Laid-Open Specification No. 6-287269 discloses a mixture of an oxime compound and an active methylene compound; Unexamined Japanese Patent Application Laid-Open Specification No. 7-304843 (corresponding to Canadian Patent No. 2148987) discloses a mixture of a triazol or a derivative thereof with a pirazole or a derivative thereof; and Unexamined Japanese Patent Application Laid-Open Specification No. 7-216051 (corresponding to Canadian Patent No. 2139365) discloses a pirazoline or a derivative thereof. However, these proposals concerning a blocking agent are also unsatisfactory for achieving a low temperature curability of the coating composition.

In addition to the above-mentioned methods in which it is attempted to lower a curing temperature for a urethane coating composition by using an improved curing accelerator or an improved blocking agent, Unexamined Japanese Patent Application Laid-Open Specification No. 6-293878 (corresponding to International Patent Application Publication No. WO 94/18254) discloses a method for lowering a curing temperature for a urethane coating composition by using as a curing agent a multifunctional polyisocyanate, i.e., a polyisocyanate having an isocyanurate skeleton, which has a number of terminal isocyanate groups. However, the curing agent used in this method is still unsatisfactory for avoiding the above-mentioned problems of a high cost for the baking for forming a coating, an air pollution caused by the baking and the like, with respect to a polyester polyol, an epoxy polyol and the like which are used as main agents in urethane coating compositions.

In the field of coating, as mentioned above, it has also been desired to diversify the function of a coating composition. For example, in cold areas, especially North America and north Europe, rock salt and gravel are scattered on a road for the purpose of preventing the road from freezing. However, the scattered rock salt and gravel are caused to leap and fly by the turning wheels of cars, and such rock salt and gravel frequently hit the cars, leading to various problems, such as occurrence of scratches on car bodies. During wintertime in the cold areas, the temperature frequently drops to −20° C. or lower. Under such low temperature conditions, coatings formed from conventional urethane coating compositions do not absorb impact caused by rock salt and gravel. In these situations, it has been strongly desired to develop a onepack type coating composition which has not only a curability even at a temperature as low as 110 to 130° C. which is frequently desirable from a practical point of view, but also can provide a high impact resistance coating capable of protecting a car body from the impact caused by rock salt and the like. However, no one-pack type urethane coating composition having excellent impact resistance has been reported.

In the field of coating compositions and sealants, a so-called plastisol which is a dispersion of a vinyl chloride polymer in a plasticizer is used. However, when a plastisol is coated on a metallic substrate, the plastisol does not exhibit satisfactory adhesion to the metallic substrate. Therefore, an improvement in adhesive property of the plastisol has been desired. Conventionally, for improving adhesive property of a plastisol, an adhesive property-imparting composition is added to the plastisol, which comprises a blocked polyisocyanate and/or a polyamide amine. With respect to the improvement in adhesive property by the use of the adhesive property-imparting composition, various proposals have been made. As such an adhesive property-imparting composition, for example, Examined Japanese Patent Application Publication No. 59-52901, discloses a polyamide amine and/or a blocked urethane prepolymer which is obtained by blocking the terminal isocyanate groups of a urethane type isocyanate prepolymer produced from a polyol and a diisocyanate with a blocking agent; Examined Japanese Patent Application Publication No. 62-41278 discloses a blocked polyisocyanate obtained by blocking with a long-chain alkyl phenol a polymer of the diisocyanate, having an average molecular weight of from 1,000 to 10,000; Unexamined Japanese Patent Application Laid-Open Specification No. 1-170633 discloses a polyamine and/or an urethane type prepolymer of a blocked polyisocyanate having an isocyanurate skeleton; and Examined Japanese Patent Application Publication No. 3-29257 (corresponding to U.S. Pat. No. 5,043,379) discloses a blocked polymer of an aromatic diisocyanate obtained using at least two types of alkylphenol blocking agents. The polyamide amines and polyamines proposed in the above documents have excellent adhesive property-imparting ability. However, they have poor water resistance, yellowing resistance and the like. In addition, the above-mentioned blocked polyisocyanates have problems in that, although they have excellent water resistance, they are incompatible with a plasticizer for a vinyl chloride polymer plastisol and have unsatisfactory adhesive properties under low temperature conditions, and thus, the use of such blocked polyisocyanates have been limited.

In British Patent No. 994890, a polyisocyanate obtained from a polyether polyol and a diisocyanate is disclosed. However, this document has no description or suggestion about a blocked polyisocyanate obtained by blocking the polyisocyanate, and a one-pack type coating composition containing such a blocked polyisocyanate. Needless to say, this document has no description about the properties of the coating composition, such as a low temperature curability.

Unexamined Japanese Patent Application Laid-Open Specification No. 7-304724 (corresponding to Canadian Patent No. 2148783) discloses a method for producing a polyisocyanate having an allophanate bond, in which a urethane bond-containing polyisocyanate (obtained by reacting a polyhydroxy compound with an aliphatic diisocyanate and/or an alicyclic diisocyanate) is reacted with an aliphatic diisocyanate and/or an alicyclic diisocyanate in the presence of a tin compound. Each of the polyhydroxy compounds used in Examples of the above document has an average number of hydroxyl groups of only 1 or 2, and there is no description about a polyhydroxy compound having a large average number of hydroxyl groups, such as an average number in the range of from 4.5 to 10. Further, there is no description about the use and effects of a specific blocked polyisocyanate obtained using as a modifier a polyhydroxy compound having such a large average number of hydroxyl groups.

Unexamined Japanese Patent Application Laid-Open Specification No. 2-132116 (corresponding to U.S. Pat. No.

4,762,752) discloses a polyisocyanate having a relatively large average number of isocyanate groups. The average number of isocyanate groups per molecule of the polyisocyanate is from 3 to 6. However, the polyisocyanates having an average number of isocyanate groups of 4 or more disclosed in the above-mentioned document have aromatic isocyanate groups and hence have poor durability.

SUMMARY OF THE INVENTION

The present inventors have made extensive and intensive studies with a view toward developing an excellent blocked polyisocyanate for use in preparing a one-pack type polyurethane coating composition comprising a polyol as a main agent and a blocked polyisocyanate as a curing agent, which is free of the abovementioned problems accompanying the conventional curing agents. As a result, it has unexpectedly been found that a novel blocked polyisocyanate obtained by blocking the terminal isocyanate groups of a specific non-blocked polyisocyanate with a thermally dissociative blocking agent (wherein the specific non-blocked polyisocyanate is obtained by reacting at least one diisocyanate selected from an aliphatic diisocyanate and alicyclic diisocyanate with a polyhydroxy compound having an average number of hydroxy groups as many as 4.5 to 10) does not cause a curing reaction at room temperature but is capable of causing a curing reaction even at a temperature in the range of from 110 to 130° C. (such a temperature is low as compared to the temperature at which conventional one-pack type urethane coating compositions can be cured) which is frequently desirable from a practical point of view, and functions as an effective curing agent for a polyol under such low temperature conditions. It has also been found that a coating composition comprising a polyol as a main agent and the above-mentioned novel blocked polyisocyanate as a curing agent not only exhibits excellent curability even under low temperature conditions, but is also capable of forming a coating which has excellent impact resistance; that the novel blocked polyisocyanate exhibits excellent compatibility with a plasticizer and is capable of forming an adhesive property-imparting composition comprising the blocked polyisocyanate and a plasticizer and/or a solvent; and that the adhesive property-imparting composition, when combined with a plastisol, is capable of providing a plastisol composition exhibiting excellent low temperature adhesive properties. The invention has been completed, based on these novel findings.

Accordingly, it is a primary object of the present invention to provide a blocked polyisocyanate which does not cause a curing reaction at room temperature but is capable of causing a curing reaction at such a relatively low temperature as is frequently desirable from a practical point of view, and which can impart an excellent low temperature curability to a one-pack type coating composition comprising a polyol as a main agent and the blocked polyisocyanate as a curing agent.

It is another object of the present invention to provide a coating composition which exhibits not only excellent curability even under low temperature conditions, but is also capable of forming a coating having excellent mechanical properties, such as impact resistance.

It is a further object of the present invention to provide an adhesive property-imparting composition comprising the above-mentioned blocked polyisocyanate having excellent compatibility with a plasticizer, wherein the adhesive property-imparting composition, when combined with a plastisol, is capable of imparting excellent low temperature adhesive properties to the plastisol.

It is still a further object of the present invention to provide a plastisol composition comprising the above-mentioned adhesive property-imparting composition and a plastisol, wherein the plastisol composition is uniform and exhibits low temperature adhesive properties.

The foregoing and other objects, features and advantages of the present invention will be apparent from the following detailed description and appended claims.

DETAILED DESCRIPTION OF THE INVENTION

Essentially, in one aspect of the present invention, there is provided a blocked polyisocyanate, which is substantially the same product as obtained by blocking 50 to 100% by mole of the terminal isocyanate groups of a non-blocked polyisocyanate with a thermally dissociative blocking agent, the non-blocked polyisocyanate being obtained by reacting at least one diisocyanate selected from the group consisting of an aliphatic diisocyanate and an alicyclic diisocyanate with a polyhydroxy compound having an average number of hydroxyl groups of from 4.5 to 10, and removing substantially all unreacted diisocyanate monomers, the non-blocked polyisocyanate having the following characteristics (a) to (d):
  (a) a cyclic isocyanate trimer content of 10% or less, in terms of a ratio of the area of a peak ascribed to a cyclic isocyanate trimer, relative to the total area of all peaks ascribed to the non-blocked polyisocyanate in a gel permeation chromatogram thereof;
  (b) an average number of terminal isocyanate groups of from 5 to 20;
  (c) a number average molecular weight of from 1,200 to 10,000 as measured by gel permeation chromatography (GPC); and
  (d) a terminal isocyanate group content of from 5 to 20% by weight, the blocked polyisocyanate having the following characteristics (e) to (g):
  (e) an average number of blocked terminal isocyanate groups of from 5 to 20;
  (f) a blocked terminal isocyanate group content of from 2 to 20% by weight; and
  (g) a number average molecular weight of from 1,500 to 15,000 as measured by GPC.

For an easy understanding of the present invention, the essential features and various preferred embodiments of the present invention are enumerated below.

1. A blocked polyisocyanate, which is substantially the same product as obtained by blocking 50 to 100% by mole of the terminal isocyanate groups of a non-blocked polyisocyanate with a thermally dissociative blocking agent, the non-blocked polyisocyanate being obtained by reacting at least one diisocyanate selected from the group consisting of an aliphatic diisocyanate and an alicyclic diisocyanate with a polyhydroxy compound having an average number of hydroxyl groups of from 4.5 to 10, and removing substantially all unreacted diisocyanate monomers, the non-blocked polyisocyanate having the following characteristics (a) to (d):
  (a) a cyclic isocyanate trimer content of 10% or less, in terms of a ratio of the area of a peak ascribed to a cyclic isocyanate trimer, relative to the total area of all peaks ascribed to the non-blocked polyisocyanate in a gel permeation chromatogram thereof;
  (b) an average number of terminal isocyanate groups of from 5 to 20;

(c) a number average molecular weight of from 1,200 to 10,000 as measured by gel permeation chromatography (GPC); and (d) a terminal isocyanate group content of from 5 to 20% by weight, the blocked polyisocyanate having the following characteristics (e) to (g):

(e) an average number of blocked terminal isocyanate groups of from 5 to 20;

(f) a blocked terminal isocyanate group content of from 2 to 20% by weight; and (g) a number average molecular weight of from 1,500 to 15,000 as measured by GPC.

2. The blocked polyisocyanate according to item 1 above, wherein the polyhydroxy compound is selected from the group consisting of a polyether polyol, a polyester polyol and a mixture thereof.

3. The blocked polyisocyanate according to item 2 above, wherein the polyhydroxy compound is a polyether polyol to which at least one organic oxide selected from the group consisting of alkylene oxides and phenylalkylene oxides is addition-bonded.

4. The blocked polyisocyanate according to item 3 above, wherein the alkylene oxide is selected from ethylene oxide, propylene oxide, butylene oxide and cyclohexene oxide, and the phenylalkylene oxide is selected from styrene oxide and phenylpropylene oxide.

5. The blocked polyisocyanate according to item 4 above, wherein the polyhydroxy compound is a polyether polyol to which propylene oxide is addition-bonded.

6. The blocked polyisocyanate according to item 1 above, which has an allophanate bond in a molecule thereof.

7. The blocked polyisocyanate according to item 1 above, wherein the thermally dissociative blocking agent is selected from the group consisting of an alkylphenol compound, an oxime compound, an acid amide compound, an active methylene compound and a mixture thereof.

8. A coating composition comprising:

(A) a polyol having a hydroxyl value of from 10 to 500 mg KOH/g, an acid value of from 0 to 200 mg KOH/g, and a number average molecular weight of from 300 to 60,000; and (B) a blocked polyisocyanate of any one of items 1 to 7 above.

9. The coating composition according to item 8 above, wherein the polyol is selected from the group consisting of an aliphatic hydrocarbon polyol, a polyether polyol, a polyester polyol, an epoxy polyol, a fluoropolyol, an acrylic polyol and a mixture thereof.

10. An adhesive property-imparting composition comprising a blocked polyisocyanate of any one of items 1 to 7 above and at least one member selected from the group consisting of a plasticizer for the blocked polyisocyanate and a solvent for the blocked polyisocyanate.

11. A plastisol composition comprising a plastisol and an adhesive property-imparting composition of item 10 above.

The present invention is explained below in more detail.

The diisocyanate used in the present invention is at least one diisocyanate selected from the group consisting of an aliphatic diisocyanate and an alicyclic diisocyanate. As an aliphatic diisocyanate, a $C_4$–$C_{30}$ aliphatic diisocyanate is preferred, and as an alicyclic diisocyanate, a $C_8$–$C_{30}$ alicyclic diisocyanate is preferred. Examples of diisocyanates include tetramethylene-1,4-diisocyanate, pentamethylene-1,5-diisocyanate, hexamethylene diisocyanate, 2,2,4-trimethylhexamethylene-1,6-diisocyanate, lysine diisocyanate, isophorone diisocyanate, 1,3-bis(isocyanatomethyl)-cyclohexane and 4,4'-dicyclohexylmethane diisocyanate. Among them, hexamethylene diisocyanate (hereinbelow, frequently referred to simply as "HMDI") and isophorone diisocyanate (hereinbelow, frequently referred to simply as "IPDI") are preferred from the viewpoint of commercial availability of the diisocyanate, and excellent weatherability of a coating formed from a coating composition as a final product which is produced using the diisocyanate. The above-mentioned diisocyanates can be used individually or in combination.

The polyhydroxy compound used in the present invention has an average number of hydroxyl groups of from 4.5 to 10, preferably from 5 to 8. The term "average number of hydroxyl groups" means an average number of hydroxyl groups contained in one molecule of a polyhydroxy compound. The average number of hydroxyl groups can be calculated from the number average molecular weight of the polyhydroxy compound and the weight part of all hydroxyl groups contained in one part by weight of the polyhydroxy compound (hereinafter, frequently referred to as "hydroxyl group content"), according to the following formula (1):

$$\frac{(\text{number average molecular weight of polyhydroxy compound}) \times (\text{hydroxyl group content})}{\text{molecular weight of a hydroxyl group (17)}} = \text{average number of hydroxyl groups} \quad (1)$$

Examples of polyhydroxy compounds include:

1) dipentaerythritol and derivatives thereof;

2) sugar alcohols, such as L-arabinitol, ribitol, xylitol, sorbitol, mannitol, galactitol and rhamnitol;

3) monosaccharides, such as glucose, mannose, galactose, fructose and sorbose;

4) disaccharides, such as trehalose, cane sugar, maltose, cellobiose, gentiobiose, lactose and melibiose;

5) trisaccharides, such as raffinose, gentianose and melezitose; and 6) tetrasaccharides, such as stachyose.

In addition to the above-mentioned polyhydroxy compounds, there can also be mentioned polyether polyols, polyester polyols and epoxy polyols, which are obtained from at least one of the above-mentioned polyhydroxy compounds.

Examples of polyether polyols include polyether polyols obtained by addition-bonding at least one organic oxide selected from the group consisting of alkylene oxides (such as ethylene oxide, propylene oxide, butylene oxide and cyclohexene oxide) and phenylalkylene oxides (such as styrene oxide and phenylpropylene oxide) to at least one of the above-mentioned polyhydroxy compounds in the presence of a strongly basic catalyst (such as hydroxides of lithium, sodium and potassium; alcoholates; and alkylamines); polyether polyols obtained by reacting multifunctional compounds, such as ethylenediamine, with an alkyleneoxide; and polymeric polyols obtained by polymerizing acrylamide or the like using the above-mentioned polyethers as reaction media.

Examples of polyester polyols include polyester polyol resins obtained by a condensation reaction of at least one organic dibasic acid (selected from succinic acid, adipic acid, sebacic acid, dimer acid, maleic anhydride, phthalic anhydride, isophthalic acid and terephthalic acid) with at least one polyhydric alcohol (selected from ethylene glycol, propylene glycol, diethylene glycol, neopentyl glycol, trimethylolpropane and glycerin); and polycaprolactam polyols, which are obtained by ring-opening, addition polymerization of ε-caprolactam with a polyhydric alcohol.

Examples of epoxy polyols include epoxy polyols of a novolak type, a β-methylepichlorohydrin type, a cyclic oxirane type, a glycidyl ether type, a glycol ether type, an epoxidized aliphatic unsaturated compound type, an epoxidized fatty acid ester type, a polycarboxylic ester type, an aminoglycidyl type, an epoxidized halogenated compound type, and a resorcin type.

Among the above-mentioned polyols as polyhydroxy compounds used in the present invention, polyether polyols and polyester polyols are preferred. Polyether polyols to which at least one organic oxide selected from the group consisting of alkylene oxides and phenylalkylene oxides is addition-bonded are more preferred. With respect to alkylene oxides and phenylalkylene oxides which are to be addition-bonded to polyether polyols, the alkylene oxide is preferably selected from ethylene oxide, propylene oxide, butylene oxide and cyclohexene oxide, and the phenylalkylene oxide is preferably selected from styrene oxide and phenylpropylene oxide. As a polyhydroxy compound used in the present invention, polyether polyols to which propylene oxide is addition-bonded are most preferred.

The above-mentioned polyols have the number average molecular weight of preferably from 500 to 5,000, more preferably from 600 to 3,000. The above-mentioned polyols can be used individually or in combination. Further, the above-mentioned polyols can be urethane-modified prior to use thereof.

For obtaining the non-blocked polyisocyanate to be used in the present invention, it is preferred that an aliphatic diisocyanate and/or an alicyclic diisocyanate be reacted with a polyhydroxy compound in a manner such that the diisocyanate and the polyhydroxy compound be used in such amounts that the isocyanate group/hydroxyl group equivalent ratio is in the range of from 2/1 to 30/1. When the isocyanate group/hydroxyl group equivalent ratio is less than 2/1, the viscosity of the reaction mixture obtained by the above reaction becomes too high, so that it is difficult to conduct a commercial-scale production of the non-blocked polyiso-cyanate. When the isocyanate group/hydroxyl group equivalent ratio is more than 30/1, the productivity of the non-blocked polyisocyanate becomes low. For efficiently obtaining the non-blocked polyisocyanate, it is more preferred that a diisocyanate and a polyhydroxy compound be used in such amounts that the isocyanate group/hydroxyl group equivalent ratio is in the range of from 5/1 to 20/1. A diisocyanate can be mixed with a polyhydroxy compound prior to the heating of the reaction system to a reaction temperature (described below). Alternatively, a diisocyanate alone can be charged in a reactor and heated to the reaction temperature and then, to the heated diisocyanate can be added a polyhydroxy compound batchwise or portionwise.

The above-mentioned reaction may be conducted in the presence of a solvent. When using a solvent, it is necessary that the solvent be inert to isocyanate groups.

The reaction temperature of the reaction between the diisocyanate and the polyhydroxy compound is generally from 60° C. to 200° C., preferably from 130° C. to 180° C. When the reaction temperature is lower than 60° C., the reaction rate becomes low, so that the increase in the average number of terminal isocyanate groups in the produced polyisocyanate (this increase is presumed to be due to an allophanation reaction) becomes slow. When the reaction temperature is higher than 200° C., a problem arises such that the produced polyisocyanate suffers discoloration.

The reaction time may vary depending on the reaction temperature. The reaction time is generally from 1 to 8 hours, preferably from 2 to 6 hours.

The reaction may be conducted in the presence of a catalyst. When using a catalyst, a basic catalyst is preferred. Examples of basic catalysts include:
1) quaternary ammonium compounds, such as a hydroxide of a tetraalkylammonium, and a tetraalkyl ammonium salt of an organic weak acid, such as acetic acid or capric acid;
2) tertiary amine compounds, such as trioctylamine, 1,4-diazabicyclo[2.2.2]octane, 1,8-diazabicyclo[5.4.0]-7-undecene and 1,5-diazabicyclo[4.3.0]-5-nonene; and
3) compounds which are known to promote an allophanation reaction, such as an acetylacetonato complex with a metal (e.g., zinc), and a metal salt of an organic weak acid (e.g., zinc, tin, lead or iron). The catalyst is used generally in an amount of from 0.001% to 1.0%, based on the amount of the diisocyanate.

By the above-mentioned reaction of a diisocyanate and a polyhydroxy compound, a polyisocyanate having urethane bonds is produced. In this reaction, at least a part of the urethane bonds present in the polyisocyanate may be converted into allophanate bonds. The conversion ratio of urethane bonds into allophanate bonds is generally 10% or more, preferably 20% or more. When the conversion ratio is less than 10%, the viscosity of the produced polyisocyanate becomes unfavorably too high.

In the present invention, a non-blocked polyisocyanate having a large average number of terminal isocyanate groups is obtained by the conversion of the urethane bonds to the allophanate bonds. From such a non-blocked polyisocyanate, the blocked polyisocyanate of the present invention can be obtained. By using the obtained blocked polyisocyanate, a coating composition comprising the blocked polyisocyanate of the present invention as a curing agent and a polyol as a main agent can be obtained, wherein the coating composition has not only excellent curability even under low temperature conditions, but is also capable of forming a coating having excellent impact resistance. Further, an adhesive property-imparting composition containing the blocked polyisocyanate of the present invention can be obtained. The adhesive property-imparting composition can be combined with a plastisol for providing a plastisol composition having excellent adhesive properties even under low temperature conditions.

In the above-mentioned reaction of a diisocyanate with a polyhydroxy compound, a polyisocyanate is produced in a yield of from 20 to 70% by weight. In the present invention, the yield of polyisocyanate is defined by the following formula:

$$\text{Yield } (\%) = \frac{\alpha - \beta}{\alpha} \times 100$$

wherein α represents the total amount of diisocyanate monomers and a polyhydroxy compound, and β represents the amount of unreacted diisocyanate monomers which are removed after completion of the reaction.

After completion of the reaction, substantially all unreacted diisocyanate monomers are removed from the resultant reaction mixture to thereby obtain a non-blocked polyisocyanate, which is to be subsequently subjected to a blocking reaction.

In the present invention, the term "average number of terminal isocyanate groups of a non-blocked polyisocyanate" means an average number of isocyanate groups per molecule of a non-blocked polyisocyanate, and can be calculated by the following formula (2):

$$\frac{\text{(Number average molecular weight of non-blocked polyisocyanate)} \times \text{(Terminal isocyanate group concentration)}}{\text{Molecular weight of an isocyanate group (42)}} = \quad (2)$$

Average number of terminal isocyanate groups, wherein the terminal isocyanate group concentration is defined as a weight ratio of terminal isocyanate groups of the non-blocked polyisocyanate to the non-blocked polyisocyanate.

In the present invention, the non-blocked polyisocyanate has an average number of terminal isocyanate groups of from 5 to 20, preferably from 5 to 14. When a non-blocked polyisocyanate having an average number of terminal isocyanate groups of less than 5 is used to prepare a blocked polyisocyanate, a coating composition produced by using such a blocked polyisocyanate is likely to have unsatisfactory curing properties. On the other hand, when a non-blocked polyisocyanate having an average number of terminal isocyanate groups of more than 20 is used to prepare a blocked polyisocyanate, a coating composition produced by using such a blocked polyisocyanate cannot be suitably used for providing a coating having good appearance, such as smooth surface finish.

The terminal isocyanate group content of the non-blocked polyisocyanate used for producing the blocked polyisocyanate of the present invention is from 5 to 20% by weight. When a non-blocked polyisocyanate having a terminal isocyanate group content of less than 5% by weight is used to prepare a blocked polyisocyanate, a satisfactory crosslink density cannot be obtained with respect to a coating obtained by curing the coating composition containing the blocked polyisocyanate of the present invention as a curing agent and containing a polyol as a main agent. On the other hand, when a non-blocked polyisocyanate having a terminal isocyanate group content of more than 20% by weight is used to prepare a blocked polyisocyanate, the crosslink density tends to become too high.

The non-blocked polyisocyanate used for producing the blocked polyisocyanate of the present invention has a number average molecular weight of from 1,200 to 10,000 as measured by gel permeation chromatography. When a non-blocked polyisocyanate having a number average molecular weight of less than 1,200 is used to prepare a blocked polyisocyanate, the crosslink density becomes too high with respect to a coating obtained by curing the coating composition containing the blocked polyisocyanate of the present invention as a curing agent and containing a polyol as a main agent. On the other hand, when a non-blocked polyisocyanate having a number average molecular weight of more than 10,000 is used to prepare a blocked polyisocyanate, a coating obtained by curing a coating composition containing such a blocked polyisocyanate has poor appearance, such as low surface smoothness.

The viscosity of the non-blocked polyisocyanate is from 2,000 to 200,000 mPa·s/25° C., preferably from 5,000 to 100,000 mPa·s/25° C. When a non-blocked polyisocyanate having a viscosity of less than 2,000 mPa·s/25° C. is used to prepare a blocked polyisocyanate, a coating composition containing such a blocked polyisocyanate suffers sags when coated on a vertical surface. When a non-blocked polyisocyanate having a viscosity of more than 200,000 mPa·s/25° C. is used to prepare a blocked polyisocyanate, a coating composition containing such a blocked polyisocyanate has poor fluidity, so that a coating obtained from the coating composition has poor appearance, such as low surface smoothness.

In Unexamined Japanese Patent Application Laid-Open Specification No. 6-293878 (corresponding to International Patent Application Publication No. WO 94/18254), the present inventors previously proposed a urethane coating composition containing a blocked polyisocyanate obtained from a polyisocyanate having an isocyanurate structure having an average number of terminal isocyanate groups of from 4.5 to 10. However, the blocked polyisocyanate of the present invention having a limited content of cyclic isocyanate trimer is different in structure from the above-mentioned blocked polyisocyanate which was previously proposed in Unexamined Japanese Patent Application Laid-Open Specification No. 6-293878. The coating composition of the present invention is a composition containing such a blocked polyisocyanate of the present invention.

In the non-blocked polyisocyanate used for producing the blocked polyisocyanate of the present invention, the cyclic isocyanate trimer content is 10% or less. When a non-blocked polyisocyanate having a cyclic isocyanate trimer content of more than 10% is used to prepare a blocked polyisocyanate, the low temperature curability of a coating composition containing such a blocked polyisocyanate is poor. In the present invention, the cyclic isocyanate trimer content of the non-blocked polyisocyanate is expressed in terms of a ratio of the area of a peak ascribed to a cyclic isocyanate trimer, relative to the total area of all peaks ascribed to the non-blocked polyisocyanate in a gel permeation chromatogram thereof, wherein the gel permeation chromatography is performed by using a refractometer as the detector and using tetrahydrofuran as the carrier.

Examples of thermally dissociative blocking agents used for blocking the terminal isocyanate groups of a non-blocked polyisocyanate include alcohol compounds, alkylphenol compounds, phenol compounds, active methylene compounds, mercaptan compounds, acid amide compounds, acid imide compounds, imidazole compounds, urea compounds, oxime compounds, amine compounds, imide compounds, and pyrazole compounds. More specific examples of thermally dissociative blocking agents are described in items (1) to (14) below.

(1) Alcohol compounds: methanol, ethanol, 2-propanol, n-butanol, sec-butanol, 2-ethyl-1-hexanol, 2-methoxyethanol, 2-ethoxyethanol, 2-butoxyethanol and the like.

(2) Alkylphenol compounds: monoalkylphenols and dialkylphenols both substituted with an alkyl group having 4 or more carbon atoms, such as para-, orthoand metha-isomers of n-propylphenol, i-propylphenol, nbutylphenol, sec-butylphenol, t-butylphenol, n-hexylphenol, 2-ethylhexylphenol, n-octylphenol, n-nonylphenol, dodecylphenol, octadecyl phenol and the like; and 2,4- and 2,6-isomers of di-n-propylphenol, diisopropylphenol, isopropylcresol, di-n-butylphenol, di-t-butylphenol, di-sec-butylphenol, diamylphenol, di-noctylphenol, di-2-ethylhexylphenol, di-n-nonylphenol and the like.

(3) Phenol compounds: phenol, cresol, ethylphenol, styrenated phenol, hydroxybenzoic ester and the like.

(4) Active methylene compounds: dimethyl malonate, diethyl malonate, methyl acetoacetate, ethyl acetoacetate, acetyl acetone and the like.

(5) Mercaptan compounds: butylmercaptan, dodecylmercaptan and the like.

(6) Acid amide compounds: acetanilide, amide acetate, ε-caprolactam, δ-valerolactam, γ-butyrolactam and the like.

(7) Acid imide compounds: succinimide, maleimide and the like.

(8) Imidazole compounds: imidazole, 2-methylimidazole and the like.

(9) Urea compounds: urea, thiourea, ethyleneurea and the like.

(10) Oxime compounds: formaldoxime, acetoaldoxime, acetoxime, methylethylketoxime, cyclohexanone oxime and the like.

(11) Amine compounds: diphenylamine, aniline, carbazole, di-n-propylamine, diisopropylamine, isopropylamine and the like.

(12) Imine compounds: ethyleneimine, polyethyleneimine and the like.

(13) Bisulfites: sodium bisulfite and the like. (14) Pyrazole compounds: pyrazole, 3-methylpyrazole, 3,5-dimethylpyrazole and the like.

Of the above-mentioned thermally dissociative blocking agents, at least one compound selected from alkylphenol compounds, oxime compounds, acid amide compounds and active methylene compounds is preferred. Especially preferred are p-nonylphenol, a para-isomer and ortho-isomer of t-butylphenol, p-dodecylphenol, acetoxime, methylethylketoxime, ε-caprolactam, alkyl actoacetate, and dialkyl malonate. These thermally dissociative blocking agents can be used individually or in combination. For example, a combination of an oxime compound and an active methylene compound, or a combination of two different types of active methylene compounds can be used.

By using the above-mentioned thermally dissociative blocking agent, 50 to 100% by mole, preferably 80 to 100% by mole of the terminal isocyanate groups of the non-blocked polyisocyanate are blocked. When the amount of the blocked terminal isocyanate groups is less than 50% by mole, a coating composition containing such a blocked polyisocyanate and a polyol has poor storage stability.

In the blocking reaction between the non-blocked polyisocyanate and the thermally dissociative blocking agent, a solvent may be used if desired. When a solvent is used, the solvent must be inert to an isocyanate group.

In the blocking reaction between the non-blocked polyisocyanate and the thermally dissociative blocking agent, a catalyst may be used. As the catalyst, an organic acid salt of a metal, such as tin, zinc or lead, a tertiary amine compound, and an alcoholate of an alkali metal, such as sodium, can be used.

The blocking reaction is generally conducted at a temperature of from −20 to 150° C., preferably from 30 to 100° C. When the reaction temperature is higher than 150° C., side reactions are likely to occur. On the other hand, when the reaction temperature is lower than −20° C., the reaction rate is too low.

The blocked polyisocyanate of the present invention thus obtained has the following characteristics (e) to (g):

(e) an average number of blocked terminal isocyanate groups of from 5 to 20;

(f) a blocked terminal isocyanate group content of from 2 to 20% by weight; and (g) a number average molecular weight of from 1,500 to 15,000 as measured by GPC.

The above-mentioned blocked polyisocyanate having such a large average number of blocked terminal isocyanate groups as mentioned above does not cause a curing reaction at room temperature but is capable of causing a curing reaction even at a temperature in the range of from 100 to 130° C. (such a temperature is low as compared to the temperature at which the conventional coating compositions can be cured) which is frequently desirable from a practical point of view, and functions as an effective curing agent for a polyol under such low temperature conditions. A one-pack type urethane coating composition comprising a polyol as a main agent and the above-mentioned blocked polyisocyanate not only exhibits excellent curability even under low temperature conditions, which cannot be achieved by the conventional one-pack type urethane coating composition, but is also capable of forming a coating which has excellent mechanical properties, such as excellent impact resistance.

In the present invention, the term "average number of blocked terminal isocyanate groups of a blocked polyisocyanate" means an average number of blocked terminal isocyanate groups per molecule of a blocked polyisocyanate, and can be calculated by the following formula (3):

$$\frac{\text{(Number average molecular weight of blocked polyisocyanate)} \times \text{(Blocked terminal isocyanate group concentration)}}{\text{Molecular weight of an isocyanate group (42)}} = \quad (3)$$

Average number of blocked terminal isocyanate groups, wherein the blocked terminal isocyanate group concentration is defined as a weight ratio of all terminal isocyanate groups (inclusive of the blocked terminal isocyanate groups) of the blocked polyisocyanate to the blocked polyisocyanate.

Examples of polyols used in the coating composition of the present invention include an aliphatic hydrocarbon polyol, a polyether polyol, a polyester polyol, an epoxy polyol, a fluoropolyol and an acrylic polyol.

Specific examples of aliphatic hydrocarbon polyols include a polybutadiene having terminal hydroxyl groups and a hydrogenation product thereof. Examples of polyether polyols include a polyether polyol obtained by subjecting at least one alkylene oxide (such as ethylene oxide or propylene oxide) to an addition reaction with at least one polyhydric alcohol (such as glycerin or propylene glycol) or with at least one polyfunctional compound (such as ethylenediamine or ethanolamine); a polytetramethylene glycol; and a so-called polymer polyol obtained by polymerizing an acrylamide or the like, using the above-mentioned polyether polyol as a reaction medium.

Specific examples of polyester polyols include a polyester polyol resin obtainable by condensation polymerization of at least one dibasic acid selected from the group consisting of succinic acid, adipic acid, sebacic acid, dimeric acid, maleic anhydride, phtahalic anhydride, isophthalic acid and terephthalic acid with at least one polyhydric alcohol (such as ethylene glycol, propylene glycol, diethylene glycol, neopentyl glycol, trimethylolpropane and glycerin); and a polycaprolactone obtainable by a ring-opening polymerization of ε-caprolactone with a polyhydric alcohol.

Specific examples of epoxy polyols include compounds of a novolak type, a β-methylepichlorohydrin type, a cyclic oxirane type, a glycidyl ether type, a glycol ether type, an epoxidized aliphatic unsaturated compound type, an epoxidized fatty acid ester type, a polycarboxylic ester type, an aminoglycidyl type, an epoxidized halogenated compound type and a resorcin type; and compounds obtained by modification of the above-mentioned epoxy polyols with an amino compound, a polyamide compound or the like.

Specific examples of fluoropolyols include copolymers of fluoroolefin monomers with at least one comonomer, such as a cyclohexylvinyl ether, a hydroxyalkylvinyl ether and vinyl esters of monocarboxylic acids [such copolymers are disclosed in, for example, Unexamined Japanese Patent Application Laid-Open Specification No. 57-34107 (corresponding to GB Patent No. 2081727) and Unexamined Japanese Patent Application Laid-Open Specification No. 61-275311 (corresponding to U.S. Pat. No. 4,640,966).

Specific examples of acrylic polyols include compounds obtainable by copolymerizing at least one acrylic monomer (having, in a molecule thereof, at least one active hydrogen) with at least one comonomer copolymerizable with the acrylic monomer. Specific examples of acrylic monomers (having, in a molecule thereof, at least one active hydrogen) include acrylic esters having at least one active hydrogen, such as 2-hydroxyethyl acrylate, 2-hydroxypropyl acrylate and 2-hydroxybutyl acrylate; methacrylic esters having at least one active hydrogen, such as 2-hydroxydiethyl methacrylate, 2-hydroxypropyl methacrylate and 2-hydroxybutyl methacrylate; and (meth)acrylic esters having two or more active hydrogens, such as an acrylic monoester or a methacrylic monoester of glycerin and an acrylic monoester or a methacylic monoester of trimethylolpropane. Examples of comonomers copolymerizable with the above-mentioned acrylic monomers include acrylic acid esters, such as methyl acrylate, ethyl acrylate, isopropyl acrylate, n-butyl acrylate and 2-ethylhexyl acrylate; methacrylic acid esters, such as methyl methacrylate, ethyl methacrylate, isopropyl methacrylate, n-butyl methacrylate, isobutyl methacrylate, n-hexyl methacrylate, cyclohexyl methacrylate, lauryl methacrylate and glycidyl methacrylate; and one or more of other polymerizable comonomers, for example, unsaturated carboxylic acids (such as acrylic acid, methacrylic acid, maleic acid and itaconic acid), unsaturated amides (such as acrylamide, N-methylolacrylamide and diacetoneacrylamide), styrene, vinyltoluene, vinyl acetate, and acrylonitrile.

It is also possible to use an acrylic polyol obtainable by copolymerizing the above-mentioned at least one acrylic monomer (having, in a molecule thereof, at least one active hydrogen) with at least one polymerizable ultraviolet-stable monomer as exemplified in, for example, Unexamined Japanese Patent Application Laid-Open Specification No. 1-261409 (corresponding to U.S. Pat. No. 5,239,028) and Unexamined Japanese Patent Application Laid-Open Specification No. 3-6273.

Polyols used in the present invention have a hydroxyl value of from 10 to 500 mg KOH/g, an acid value of from 0 to 200 mg KOH/g, and a number average molecular weight of from 300 to 60,000. Most preferred examples of polyols are an acrylic polyol, a polyester polyol and an epoxy polyol.

When the hydroxyl value of the polyol is less than 10 mg KOH/g, a coating obtained by curing the coating composition has a low crosslink degree and hence does not have desired mechanical properties. When the hydroxyl value exceeds 500 mg KOH/g, a coating obtained by curing the coating composition has unfavorably low flexibility. When the number average molecular weight is outside the above-mentioned range, it is possible that a good coating cannot be obtained.

It is preferred that the acid value of the polyol be low, namely not more than 20 mg KOH/g.

In the coating composition of the present invention, the equivalent ratio of the blocked isocyanate groups in the blocked polyisocyanate to the hydroxyl groups in the polyol is selected in accordance with the desired properties of the coating, but is usually in the range of from 10:1 to 1:10.

Melamine resins may be used in the coating composition of the present invention. Examples of melamine resins include hexamethoxymethylolmelamine, a methylol type alkyl melamine, a completely alkylated type melamine and an imino type melamine. Specific examples of these melamines include methylated and butylated melamine and butylated melamine. By using these melamine resins, the mechanical properties of the coating, such as a hardness thereof, can be controlled.

Various types of solvents and additives may be optionally used depending on the uses and purposes. Examples of solvents include hydrocarbons (such as benzene, toluene, xylene, cyclohexane, mineral spirit, naphtha and the like); ketones (such as acetone, methyl ethyl ketone, methyl isobutyl ketone and the like); esters (such as ethyl acetate, n-butyl acetate, cellosolve acetate and the like); and alcohols (such as n-butanol, isopropyl alcohol and the like). These solvents may be used individually or in combination.

Further, if desired, there may also be used curing accelerators (for example, at least one salt of a carboxylic acid with a metal, such as tin, zinc, lead or the like); antioxidants (such as hindered phenols and the like); UV absorbents (such as benzotriazole, benzophenone and the like); pigments (such as titanium oxide, carbon black, indigo, quinacridone, pearl mica and the like); metallic powder pigments (such as aluminum powder and the like); and rheology controlling agents (such as hydroxyethyl cellulose, urea compounds and the like). These curing accelerators, antioxidants and the like can be used in amounts conventionally used in the art.

The coating composition thus prepared is useful as materials for undercoating, top coating and intercoating metallic substances (such as a steel plate and a surface-treated steel plate) and plastic substances; a coating material for a pre-coated metal or a rust-resistant steel plate; and a coating material for imparting fine appearance, weathrability, acid resistance, rust resistance, mechanical strength (such as chipping resistance and impact resistance) and the like to automobiles. The application of the coating composition onto various substrates can be performed by, for example, roll coating, curtain flow coating, spray coating, dip coating, electrodeposition coating and the like.

The blocked polyisocyanate of the present invention has also an excellent performance as an adhesive property-imparting agent. Specifically, by diluting the blocked polyisocyanate of the present invention with a plasticizer therefor and/or a solvent therefor, an adhesive property-imparting composition can be obtained. The dilution with a plasticizer and/or a solvent is carried out for the purposes of lowering the viscosity of the adhesive property-imparting composition and improving the processability thereof and the like. Further, when the adhesive property-imparting composition is combined with a plastisol (explained below) and the resultant plastisol composition is subjected to curing, the plasticizer used for the dilution acts as one component of the cured plastisol composition and exhibits an effect for imparting a desired mechanical properties to the cured plastisol composition. On the other hand, when the adhesive property-imparting composition is added to a plastisol, the solvent used for the dilution improves the processability of the plastisol composition, but evaporates later and does not remain in a cured plastisol composition.

The concentration of the plasticizer and/or the solvent in the adhesive property-imparting composition varies depending on uses and purposes, but is usually from 20 to 80% by weight.

With respect to the plasticizer, there is no particular limitation as long as it is a plasticizer usually used for vinyl chloride polymers. Examples of plasticizers include phthalic esters and isophthalic esters, such as dimethyl phthalate, diethyl phthalate, di-n-butyl phthalate, diheptyl phthalate, di-n-octyl phthalate, di-2-ethylhexyl phthalate (hereinafter referred as "DOP"), diisononyl phthalate, octyl decyl phthalate, diisodecyl phthalate, butyl benzyl phthalate, di-2-ethylhexyl isophthalate and the like; aliphatic esters, such as di-2-ethylhexyl adipate, di-n-decyl adipate, diisodecyl adipate, di-2-ethylhexyl azelate, dibutyl sebacate, di-2-ethylhexyl sebacate and the like; phosphoric esters, such as tributyl phosphate, tri-2-ethylhexyl phosphate, 2-ethylhexyl diphenyl phosphate, tricresyl phosphate and the like; epoxides, such as epoxidized soybean oil, epoxidized tall oil fatty acid 2-ethylhexyl ester and the like. Of them, preferred are phthalic esters, and more preferred are di-n-octyl phthalate, DOP, diisononyl phthalate and octyl decyl phthalate. These plasticizers can be used individually or in combination.

The solvent can be appropriately selected from hydrocarbons, such as benzene, toluene, xylene, cyclohexane, mineral spirit, naphtha and the like; ketones, such as acetone, methyl ethyl ketone, methyl isobutyl ketone and the like; esters, such as ethyl acetate, n-butyl acetate, cellosolve acetate and the like; and alcohols, such as n-butanol, isopropyl alcohol and the like. These solvents can be used individually or in combination.

Further, plasticizers and solvents can be used in combination.

If desired, conventionally known adhesive property-imparting agents, for example, polyamide amine compounds (obtained by reacting a polymeric fatty acid, such as a dimer acid, with a polyamine compound) and aliphatic polyamines, (such as ethylene diamine, diethylene triamine) may also be used in combination with solvents and/or plasticizers.

The adhesive property-imparting composition is usually used for improving the low temperature adhesion properties of a plastisol (which is a dispersion of a vinyl chloride polymer in the above-mentioned plasticizers). The amount of the adhesive property-imparting composition to be added to the plastisol varies depending on the use of the plastisol composition. However, the amount of the adhesive property-imparting composition to be added is usually from 0.5 to 15% by weight, based on the weight of the vinyl chloride polymer in the plastisol. Conventional blocked polyisocyanates, especially conventional blocked polyisocyanates derived from an aliphatic diisocyanate and/or an alicyclic diisocyanate, have poor compatibility with the above-mentioned plasticizers, so that a conventional plastisol composition containing a conventional blocked polyisocyanate and a plasticizer has poor adhesion properties at low baking temperatures. Therefore, the use of the conventional plastisol composition is limited. By contrast, the blocked polyisocyanate of the present invention has good compatibility with the above-mentioned plasticizers (despite the fact that the blocked polyisocyanate of the present invention is derived from an aliphatic diisocyanate and/or an alicyclic diisocyanate), so that the blocked polyisocyanate of the present invention has the ability to impart excellent adhesion properties to a plastisol even at low baking temperatures.

The above-mentioned vinyl chloride polymer used in the plastisol comprises a base resin having a particle diameter of 5 $\mu$m or less, preferably from 0.05 to 3 $\mu$m, and a paste resin, and optionally a blending resin which is usually employed together with a paste resin. The above-mentioned base resin is obtained by subjecting vinyl chloride or a mixture of vinyl chloride and a comonomer copolymerizable with vinyl chloride to emulsion polymerization in the presence of an emulsifier and an aqueous polymerization initiator. The above-mentioned paste resin is obtained by a microsuspension polymerization method in which vinyl chloride or a mixture of vinyl chloride and a comonomer copolymerizable with vinyl chloride is mechanically dispersed (at least partially micro-dispersed) in the presence of a dispersant and an oil-soluble polymerization initiator and then, subjected to suspension polymerization. Further, a polyvinyl chloride resin and/or a vinyl chloride copolymer resin which is obtained by ordinary suspension polymerization and has a relatively large particle diameter may be added to the above-mentioned vinyl chloride polymer, as long as the viscosity, flowability and processability of the plastisol composition is not adversely affected. Examples of comonomers copolymerizable with vinyl chrolide used for producing a vinyl chloride copolymer include vinyl esters, such as vinyl acetate, vinyl propionate and vinyl laurate; acrylic esters, such as methyl acrylate, ethyl actylate, butyl acrylate, 2-hydroxyethyl acrylate, 2-hydroxypropyl acrylate and 3-hydroxybutyl acrylate; methacrylic esters, such as methyl methyacrylate, ethyl methacrylate, 2-hydroxyethyl methacrylate, 2-hydroxypropyl methacrylate and 3-chloro-2-hydroxypropyl methacrylate; maleic esters, such as dibutyl maleate, diethyl maleate and ethyl 2-hydroxyethyl maleate; fumaric esters, such as dibutyl fumarate and diethyl fumarate; vinyl ethers, such as vinyl methyl ether, vinyl butyl ether and vinyl hydroxybutyl ether, vinyl octyl ether; vinyl cyanides, such as acrylonitrile and methacrylonitrile; $\alpha$-olefins, such as ethylene, propylene and styrene; vinylidene halides or vinyl halides other than vinyl chloride, such as vinylidene chloride and vinyl bromide; and n-methylol acrylamide.

In addition to the above-mentioned components, the plastisol composition may further contain additives, such as an agent for accelerating the dissociation of blocking groups from the terminal isocyanate groups of the blocked polyisocyanate, a diluent, a filler, a thickening agent, a colorant and the like. Examples of agents for accelerating the dissociation of blocking groups from the terminal isocyanate groups include salts of a carboxylic acid with a metal, such as tin, zinc or lead; and a tin oxide, a zinc oxide and a lead oxide. The agent for accelerating the dissociation of blocking groups from the terminal isocyanate groups is used in an amount of from 0 to 10% by weight, based on the weight of the plastisol. Examples of diluents include aliphatic hydrocarbon solvents (such as hexane, heptane, octane, nonane and decane), naphthene type hydrocarbon solvents (such as cyclohexane, methyl cyclohexane, dimetyl cyclohexane and diethylcyclohexane), and aromatic hydrocarbon solvents [such as toluene, xylene, ethyl benzene and, Solvesso # 100 and Solvesso # 150 (both of which are manufactured and sold by Exxon, U.S.A.]. The diluent is used for the purpose of controlling the viscosity or the like of the plastisol composition. The diluent is used in an amount of from 0 to 10% by weight, based on the weight of the plastisol. Examples of fillers include inorganic fillers, such as light calcium carbonate, heavy calcium carbonate, talc, diatomite, kaolin and barium sulfate; and organic fillers, such as a cellulose powder, a powdery rubber and a regenerated rubber. The filler is used for the purposes of maintaining the mechanical properties (such as hardness) of a gelation product of the plastisol composition and also preventing the plastisol composition from sagging at the time of the coating operation. The filler can be used in an amount of from 50 to 300% by weight, based on the weight of the plastisol. Examples of thickening agents include anhydrous silica, organic bentonite and a metallic soap and the like. The thickening agent is used for the purpose of, for example, controlling the viscosity of the plastisol composition. The thickening agent is used in amount of from 0 to 50% by weight, based on the weight of the plastisol.

The coating weight of the plastisol composition thus prepared is usually from 150 to 3,000 g/m$^2$. The thickness of the coating is usually from 0.15 to 3 mm. After the coating operation, the baking of the coating is conducted. The baking of the coating can be conducted even at a temperature as low as from 110° C. to 130° C., which is frequently desirable from a practical point of view. The baking time is usually from 20 to 40 minutes.

Examples of coating methods for the plastisol composition of the present invention include spraying, brushing, dipping, injection, pouring, air-spraying and the like.

The plastisol composition of the present invention has a wide variety of industrial applications. For example, the plastisol composition of the present invention can be used not only as a sealant, an undercoating material and an anti-chipping agent, but also in the production of PCM (precoated metal), such as vinyl chloride polymer-coated steel plates. The plastisol composition of the present invention can be advantageously used especially in automobile industry, for example, as an undercoating material for a polyester resin coating composition, an epoxy resin coating composition, an acrylic resin coating composition or the like. Specifically, the plastisol composition of the present invention can be advantageously applied onto automobile bodies having a coating formed thereon by cationic electrodeposition, wherein the plastisol composition is employed for the purposes of preventing rust and providing a cushioning effect against pebbles or the like hitting the car body.

BEST MODE FOR CARRYING OUT THE INVENTION

Hereinbelow, the present invention will be described in more detail with reference to the following Reference Examples, Comparative Reference Examples, Examples and Comparative Examples, but they should not be construed as limiting the scope of the present invention.

In the following Examples and Comparative Examples, various properties were measured and/or evaluated by the following methods.

(1) Number Average Molecular Weight:

A sample of polyisocyanate for measurement of the number average molecular weight thereof was prepared by dissolving the polyisocyanate to tetrahydrofuran (THF) so that the final concentration of the polyisocyanate in THF became about 0.25% by weight. The prepared sample was subjected to gel permeation chromatography (GPC) using HLC-802A (manufactured and sold by TOSOH Corporation, Japan) to thereby determine the number average molecular weight thereof by using a calibration curve obtained with respect to a standard polystyrene. When the number average molecular weight was less than 2,000, the GPC was conducted using columns G1000HXL, G2000HXL and G3000HXL (each of which was manufactured and sold by TOSOH Corporation, Japan), and using THF as a carrier, wherein a refractive index detector and a chromatoprocessor (CP-8000, manufactured and sold by TOSOH Corporation, Japan) were used. When the number average molecular weight was 2,000 or more, the GPC was conducted using columns G2000HXL, G4000HXL and G5000HXL (each of which was manufactured and sold by TOSOH Corporation, Japan), and using THF as a carrier, wherein a refractive index detector and a chromatoprocessor (CP-8000, manufactured and sold by TOSOH Corporation, Japan) were used.

(2) Cyclic Isocyanate Trimer Content:

A cyclic isocyanate trimer content was expressed in terms of a ratio of the area of a peak ascribed to a cyclic isocyanate trimer [for example, in the case of a trimer derived from hexamethylene diisocyanate (HMDI), the area of a peak corresponding to the molecular weight 504 of the cyclic isocyanate trimer derived from HMDI], relative to the total area of all peaks ascribed to the non-blocked polyisocyanate in a gel permeation chromatogram.

(3) Allophanate Bond Concentration:

The allophanate bond concentration of a polyisocyanate composition was measured and evaluated by the following method.

About 0.5 g of acetone-$d_6$ [$(CD_3)_2CO$], 2 to 5 mg of a sample polyisocanate and about 100 ppm by volume, based on the volume of the acetone-$d_6$ [$(CD_3)_2CO$] of tetramethylsilane were mixed in a sample tube to prepare a sample. The prepared sample was analyzed by $^1$H-NMR using FT-NMR (FX90Q, sold and manufactured by JEOL Ltd., Japan). Using the integral (area) of a peak corresponding to the allophanate bond ([A]) and the integral (area) of a peak corresponding to the urethane bond ([U]) obtained from the above analysis, the allophanate bond concentration (%) was calculated using the following formula:

$$\text{Allophanate bond concentration (\%)} = \frac{[A]}{[A]+[U]} \times 100.$$

The allophanate bond concentrations were classified into three degrees of A, B and C in accordance with the following criteria:

| Concentration | Criteria |
| --- | --- |
| 90% or more | A |
| 10% or more and less than 90% | B |
| less than 10% | C |

(4) Viscosity of Polyisocyanate:

The viscosity of polyisocyanate was measured using an Emila-type rotating viscometer (manufactured and sold by Reciprotor Co., Denmark).

A sample of polyisocyanate was placed in a sample holder maintained at 25° C. The rotor of the viscometer was rotated until the viscosity indicated by the viscometer became constant. The value of this constant viscosity was taken as the viscosity of the measured polyisocyanate.

(5) Gel Ratio of Coating Composition:

The gel ratio of a coating composition was determined as follows.

0.1 g of the coating was subjected to extraction with 50 g of acetone at 20° C. for 24 hours. The gel ratio was calculated using the following formula:

Gel Ratio(%)=(the weight of coating remaining undissolved after immersion of the coating in acetone for 24 hours/the original weight of the coating)×100.

The gel ratio was evaluated in accordance with the following criteria:

| Gel ratio | Criteria |
| --- | --- |
| 90% or more | ⊚ |
| 80% to less than 90% | ○ |
| less than 80% | x |

When an epoxy polyol was used as a main agent of a coating composition, methanol was used instead of the acetone in the above-mentioned extraction step.

(6) Impact Resistance Property:

The evaluation of the impact resistance of a coating composition was conducted by using Du-pont impact tester. A steel plate having a coating prepared from a coating composition was placed on a flat bearer. After disposing a center of impact (radius: 1/3 inch) thereon, a load of 500 g was caused to fall on the center of impact from the height of 50 cm. The coating at −20° C. was observed. The impact resistance of the coating was evaluated in accordance to the following criteria:

| Impact resistance | Criteria |
| --- | --- |
| no damage observed on the coating | ○ |
| damage observed on the coating | x |

(7) Adhesive Property:

The adhesive property of a plastisol composition was measured and evaluated by the following method.

A plastisol composition was applied onto a first adherend (a steel plate having a coating formed by cationic eltrodeposition) at a thickness of 0.5 mm, and a second adherend (which is the same as the first adherend) was placed on plastisol-coated face of the first adherend, followed by ba king at 120° C. for 30 minutes. The shearing adhesion strength (kg/cm$^2$) was measured at a pulling rate of 5 mm/hr. The shearing adhesion strength was evaluated in accordance with the following criteria:

| Shearing adhesion strength | Criteria |
| --- | --- |
| 15 kg/cm$^2$ or more | ○ |
| less than 15 kg/cm$^2$ | x |

(8) Content of Non-Blocked Isocyanate Groups:

The content (% by weight) of non-blocked isocyanate groups in a non-blocked polyisocyanate was determined as follows.

About 2 to 5 g of a polyisocyanate was accurately weighed and taken as a sample. 20 ml of toluene and 20 ml of a 2N solution of n-dibutylamine in toluene were added to the sample polyisocyanate. The resultant was allowed to stand at room temperature for 15 minutes, and then subjected to back titration using 1N hydrochloric acid. Using Bromocresol Green as an indicator, the content of non-blocked isocyanate groups was determined in accordance with the following formula:

The content (% by weight) of non-blocked isocyanate groups= {(titer of blank titration)−(titer of sample titration)}×42/{weight (g) of sample×1000}×100.

The titer of blank titration means a titer obtained by conducting titration in substantially the same manner as mentioned above, except that the polyisocyanate was not used.

(9) Content of Blocked Isocyanate Groups:

The blocked isocyanate group content of the blocked polyisocyanate was expressed in terms of the content (% by weight) of the isocyanate groups per se in non-blocked form.

The following measurements [A] and [B] were performed, and the content of blocked polyisocyanate groups was determined in accordance with the following formula:

The content of blocked isocyanate groups (% by weight)=(a)−(b).

[A] The content (% by weight) of all isocyanate groups in a blocked polyisocyanate was determined as follows.

About 2 to 5 g of a blocked polyisocyanate was accurately weighed and taken as a sample. 20 ml of toluene and 20 ml of a 2N solution of diethylhexylamine in toluene were added to the sample blocked polyisocyanate. The resultant was allowed to stand at 60 to 120° C. for several tens of minutes to several hours, and then subjected to back titration using 1N hydrochloric acid at room temperature. Using Bromocresol Green as an indicator, the content (a) of all isocyanate groups in the blocked polyisocyanate was determined in accordance with the following formula:

The content (% by weight) (a) of all isocyanate groups={(titer of blank titration)−(titer of sample titration)}×42/{(weight (g) of sample×1000}×100.

The titer of blank titration means a titer obtained by conducting titration in substantially the same manner as mentioned above, except that the blocked polyisocyanate was not used.

[B] The content (% by weight) of non-blocked isocyanate groups in a blocked polyisocyanate was determined as follows.

About 2 to 5 g of a polyisocyanate was accurately weighed and taken as a sample. 20 ml of toluene and 20 ml of a 2N solution of n-dibutylamine in toluene were added to the sample polyisocyanate. The resultant was allowed to stand at room temperature for 15 minutes, and then subjected to back titration using 1N hydro chloric acid. Using Bromocresol Green as an indicator, the content (b) of non-blocked isocyanate groups was determined in accordance with the following formula:

The content (% by weight) (b) of non-blocked isocyanate groups= {(titer of blank titration)−(titer of sample titration)}×42/{weight (g) of sample×1000}×100.

The titer of blank titration means a titer obtained by conducting titration in substantially the same manner as mentioned above, except that the blocked polyisocyanate was not used.

(10) Hydroxyl Value of Polyol:

The hydroxyl value of a polyol was defined as the amount (mg) of KOH which was required for neutralizing acetic acid necessary for acetylation of free OH groups contained in 1 g of the polyol.

Measurement of the hydroxyl value of a polyol was conducted according to JIS-K0070.

(11) Acid Value of Polyol:

The acid value of a polyol was defined as the amount (mg) of KOH which was required for neutralizing free fatty acids contained in 1 g of the polyol.

Measurement of the hydroxyl value of a polyol was conducted according to JIS-K0070.

(12) Solids Content:

The solids content of a polyisocyanate, a blocked polyisocyanate and coating composition was determined as follows.

About 1.5 g of a sample was accurately weighed, and the sample was heated at 105° C. under atmospheric pressure for 1 hour, whereupon the weight of the sample after heating was measured. The weight of the sample after heating was taken as the amount (weight) of the solids.

REFERENCE EXAMPLE 1

(Production of a polyisocyanate)

A four-necked flask provided with a stirrer, a thermometer, a reflux condenser, a nitrogen gas feeding pipe and a dropping funnel was purged with nitrogen gas. 600 Parts by weight of hexamethylene diisocyanate (HMDI) and 49 parts by weight of a polyether polyol (Adeka polyetherpolyol SP-600, manufactured and sold by Asahi Denka Kogyo K. K., Japan; number average molecular weight: 610; isocyanate group/hydroxyl group equivalent ratio= 15:1) as a hexahydric polyhydroxy compound were charged in the flask, and the resultant was stirred for 9 hours while maintaining the internal temperature of the flask at 160° C., to thereby effect a reaction. The resultant reaction mixture was cooled and transferred to a wiped film evaporator, and unreacted HMDI remaining in the mixture was removed, to thereby obtain a polyisocyanate. The obtained polyisocyanate was analyzed by the above-mentioned methods. As a result, it was found that, with respect to the polyisocyanate, the viscosity was 6,200 mpa·s at 25° C., the terminal isocyanate group content was 16.9% by weight, the number average molecular weight was 1,940, the average number of terminal isocyanate groups was 7.8, and the cyclic isocyanate trimer content was 2.6% by area. It was also found that the allophanate bond concentration of the polyisocyanate was of degree B.

REFERENCE EXAMPLES 2 TO 7, COMPARATIVE REFERENCE EXAMPLES 1 TO 3

Polyisocyanates were individually prepared in substantially the same manner as in Reference Example 1 except that the reaction was conducted under the reaction conditions as shown in Table 1. The unreacted HMDI remaining in the reaction mixture was removed in the same manner as in Reference Example 1, to thereby obtain a polyisocyanate. Each of the obtained polyisocyanates was analyzed by the above mentioned methods. Results are shown in Table 1.

COMPARATIVE REFERENCE EXAMPLE 4

A four-necked flask provided with a stirrer, a thermometer, a reflux condenser, a nitrogen gas feeding pipe and a dropping funnel was purged with nitrogen gas. 600 parts by weight of HMDI and 11 parts by weight of 1,3-butanediol were charged in the flask, and the resultant was stirred for 2 hours while maintaining the internal temperature of the flask at 80° C., to thereby effect a reaction. Then, the internal temperature of the flask was lowered to 60° C., and 0.060 part by weight of tetramethyl ammonium caprate as a catalyst for forming isocyanurate was added to the reaction mixture. The reaction mixture was intermittently sampled with the progress of the reaction, and the polyisocyanate content of the sample was determined by measuring the refractive index of the sample. 0.073 Part by weight of phosphoric acid was added at the point in time that the yield of polyisocyanate reached 28% by weight, so that the reaction was terminated. The polyisocyanate-containing reaction mixture was subjected to filtration, and the unreacted HMDI remaining in the filtrate was removed by means of a wiped film evaporator, to thereby obtain a polyisocyanate. The obtained polyisocyanate was analyzed by the above-mentioned methods. Results are shown in Table 1.

COMPARATIVE REFERENCE EXAMPLE 5

A four-necked flask provided with a stirrer, a thermometer, a reflux condenser, a nitrogen gas feeding pipe and a dropping funnel was purged with nitrogen gas. 600 Parts by weight of HMDI and 30 parts by weight of a polyester polyol "Placcel 303" (manufactured and sold by Dicel Chemical Industries, Ltd., Japan) as a trihydric alcohol were charged in the flask, and the resultant was stirred for 1 hour while maintaining the internal temperature of the flask at 90° C., to thereby effect a reaction. Then, the internal temperature of the flask was lowered to 60° C., and 0.060 part by weight of tetramethyl ammonium caprate as a catalyst for forming isocyanurate was added to the reaction mixture. The reaction mixture was intermittently sampled with the progress of the reaction, and the polyisocyanate content of the sample was determined by measuring the refractive index of the sample. 0.073 Part by weight of phosphoric acid at the point in time that the yield of polyisocyanate reached 54% by weight, so that the reaction was terminated. The polyisocyanate-containing reaction mixture was subjected to filtration, and the unreacted HMDI remaining in the filtrate was removed by mean of a wiped film evaporator, to thereby obtain a polyisocyanate. The obtained polyisocyanate was analyzed by the above-mentioned methods. Results are shown in Table 1.

TABLE 1

| | Charged materials (amounts) and NCO/OH | | | Reaction conditions | | Properties of Polyisocyanantes | | | | | |
|---|---|---|---|---|---|---|---|---|---|---|---|
| | Diisocyanate | Polyhydroxyl Compound | NCO/OH (equi- | | | Average number of terminal | Terminal isocyanate group content | Viscosity | Number-average molecular | Cyclic isocyanate trimer content | Concentration of allophanate bonds |
| | (parts by wt.) | (parts by wt.) | valent ratio) | Temp. (° C.) | Time (Hr) | isocyanate groups | (% by wt.) | (mPa.s at 25° C.) | lar weight | (% by area) | bonds (degree) |
| Reference Example 1 | HMDI 600 | SP-600*1 49 | 15 | 160 | 9 | 7.8 | 16.9 | 6200 | 1940 | 2.6 | B |
| Reference Example 2 | HMDI 600 | SP-800*2 49 | 15 | 160 | 9 | 10.2 | 17.3 | 8600 | 2480 | 6.1 | B |

TABLE 1-continued

| | Charged materials (amounts) and NCO/OH | | | | | Properties of Polyisocyanantes | | | | | |
|---|---|---|---|---|---|---|---|---|---|---|---|
| | | | | | | | Terminal iso- | | | Cyclic isocya- | Concen- |
| | Diisocy-anate | Poly-hydroxyl Compound | NCO/OH (equi- | Reaction conditions | | Average number of terminal | cyanate group content | Viscosity | Number-average molecu- | nate trimer content | tration of allop-hanate |
| | (parts by wt.) | (parts by wt.) | valent ratio) | Temp. (° C.) | Time (Hr) | isocyanate groups | (% by wt.) | (mPa.s at 25° C.) | lar weight | (% by area) | bonds (degree) |
| Reference Example 3 | HMDI 600 | HP-1030*3 67 | 20 | 160 | 2 | 5.1 | 13.6 | 8600 | 1580 | 3.1 | B |
| Reference Example 4 | HMDI 600 | HP-2000*4 250 | 10 | 160 | 3 | 7.3 | 8.5 | 15000 | 3600 | 2.5 | B |
| Reference Example 5 | HMDI 600 | HP-1030 134 | 10 | 150 | 5 | 7.2 | 12.0 | 31000 | 2520 | 2.1 | B |
| Reference Example 6 | HMDI 600 | HP-1030 134 | 10 | 170 | 2 | 12.2 | 9.9 | 53000 | 3400 | 2.8 | B |
| Reference Example 7 | HMDI 600 | HP-1030 174 | 7.5 | 160 | 3 | 10.1 | 11.2 | 86000 | 3770 | 0.8 | B |
| Comparative Reference Example 1 | HMDI 600 | WR-474*5 169 | 5 | 120 | 3 | 5.3 | 13.2 | 20000 | 1690 | 1.7 | B |
| Comparative Reference Example 2 | HMDI 600 | P-400*6 74 | 20 | 120 | 3 | 2.2 | 10.9 | 1100 | 840 | 2.9 | C |
| Comparative Reference Example 3 | HMDI 600 | G-400*7 74 | 20 | 120 | 3 | 3.2 | 10.2 | 2800 | 1010 | 1.9 | C |
| Comparative Reference Example 4 | HMDI 600 | 1,3-butane-diol 11 | 30 | 80 60 | 2 4 | 3.4 | 21.2 | 2300 | 680 | 40.0 | A |
| Comparative Reference Example 5 | HMDI 600 | Plac-cell303*8 30 | 25 | 90 60 | 1 4 | 5.1 | 19.2 | 9500 | 1100 | 24.0 | A |

*1 SP-600: hexahydric polyether polyol (manufactured and sold by Asahi Denka Kogyo K. K., Japan)
*2 SC-800: octahydric polyether polyol (manufactured and sold by Asahi Denka Kogyo K. K., Japan)
*3 HP-1030: pentahydric polyether polyol (manufactured and sold by Asahi Denka Kogyo K. K., Japan)
*4 HP-2000: pentahydric polyether polyol (manufactured and sold by Asahi Denka Kogyo K. K., Japan)
*5 WR-474: tetrahydric polyether polyol (manufactured and sold by Asahi Denka Kogyo K. K., Japan)
*6 P-400: dihydric polyether polyol (manufactured and sold by Asahi Denka Kogyo K. K., Japan)
*7 G-400: trihydric polyether polyol (manufactured and sold by Asahi Denka Kogyo K. K., Japan)
*8 Placcell 303: trihydric polyester polyol (manufactured and sold by Asahi Denka Kogyo K. K., Japan)

EXAMPLE 1
(Production of a blocked polyisocyanate)

A four-necked flask provided with a stirrer, a thermometer, a reflux condenser, a nitrogen gas feeding pipe and a dropping funnel was purged with nitrogen gas. 100 Parts by weight of the polyisocyanate prepared in Reference Example 1 and 32 parts by weight of methyl isobutyl ketone were charged in the flask. To the resultant mixture was dropwise added methyl ethyl ketoxime through the dropping funnel, while maintaining the internal temperature of the flask at a temperature not exceeding 50° C., to thereby effect a reaction. The addition of methyl ethyl ketoxime was continued until an absorption peak characteristic of an isocyanate group in the infrared spectrum was no longer observed. Thus a solution of a blocked polyisocyanate (solids content: 80% by weight) was obtained. The obtained blocked polyisocyanate solution was analyzed according to the above-mentioned methods, and the analysis showed that, with respect to the blocked polyisocyante, the average number of blocked terminal isocyanate groups was 7.8, the blocked terminal isocyanate group content was 12.5% by weight, based on the weight of the blocked polyisocyanate, and the number average molecular weight of the blocked polyisocyanate was 2,620.

EXAMPLES 2 TO 7
(Production of blocked polyisocyanates)

Blocked polyisocyanates having a solids content of 80% by weight were individually prepared in substantially the same manner as in Example 1, except that the polyisocyanates prepared in Reference Examples 2 to 7 were respectively used in these Examples 2 to 7 instead of the polyisocyanate prepared in Example 1. Each of the obtained blocked polyisocyanates was analyzed by the above-mentioned methods. Results are shown in Table 2.

COMPARATIVE EXAMPLES 1 TO 5
(Production of blocked polyisocyanates)

Blocked polyisocyanates having a solids content of 80% by weight were individually prepared in substantially the same manner as in Example 1, except that the polyisocyanates prepared in Comparative Reference Examples 1 to 5 were respectively used in these Comparative Examples 1 to 5 instead of the polyisocyanate prepared in Example 1. Each of the obtained blocked polyisocyanates was analyzed by the above-mentioned methods. Results are shown in Table 2.

TABLE 2

Properties of Blocked Polyisocyanates

|  | Average number of blocked terminal isocyanate groups | Terminal isocyanate group content (wt. %) | Number Average Molecular Weight |
|---|---|---|---|
| Example 1 | 7.8 | 12.5 | 2620 |
| Example 2 | 10.2 | 12.7 | 3370 |
| Example 3 | 5.1 | 10.6 | 2025 |
| Example 4 | 7.3 | 7.2 | 4240 |
| Example 5 | 7.2 | 9.6 | 3150 |
| Example 6 | 12.2 | 8.2 | 4460 |
| Example 7 | 10.1 | 9.1 | 4650 |
| Comparative Example 1 | 5.3 | 10.4 | 2150 |
| Comparative Example 2 | 2.2 | 8.9 | 1030 |
| Comparative Example 3 | 3.2 | 8.4 | 1290 |
| Comparative Example 4 | 3.4 | 14.7 | 980 |
| Comparative Example 5 | 5.1 | 13.7 | 1540 |

EXAMPLE 8

(Evaluation of coating composition obtained using acrylic polyol)

The blocked polyisocyanate prepared in Example 1 and acrylic polyol (Acrydic A-801, manufactured and sold by Dainippon Ink & Chemicals, Inc., Japan; hydroxyl value of the solids content: 100 mg KOH/g; acid value of the solids content: 1.5 mg KOH/g; and number average molecular weight: 9,000) were mixed with each other, so that the blocked isocyanate groups/hydroxyl groups equivalent ratio became 1:1, to obtain a mixture. To the resultant mixture was added 0.5% by weight of dibutyltin dilaurate, based on the total weight of the solids in the mixture of the blocked polyisocyanate and the acrylic polyol. For the purpose of obtaining a coating composition, the resultant mixture was diluted with a mixture of ethyl acetate/toluene/butyl acetate/xylene/propylene glycol monomethyl ether acetate (weight ratio: 30/30/20/15/5) in a dilution ratio such that a coating compostion having a viscosity of 20 seconds/20° C. as measured by means of a Ford cup #4 was obtained. For evaluating the coating composition, the coating composition was sprayed onto a polypropylene plate (size: 50 mm×150 mm), and dried at room temperature for 30 minutes to thereby obtain a coating. The obtained coating was baked at 120° C. for 30 minutes in an oven. With respect to the baked coating, the gel ratio was measured by the above-mentioned method. Results are shown in Table 3.

EXAMPLES 9 TO 14

Coating compositions were individually prepared in substantially the same manner as Example 8, except that the blocked polyisocyanates prepared in Examples 2 to 7 were, respectively, used in these Examples 9 to 14 instead of the blocked polyisocyanate prepared in Example 1. Each of the prepared coating compositions was evaluated with respect to the gel ratio thereof in the same manner as in Example 8. Results are shown in Table 3.

COMPARATIVE EXAMPLES 6 AND 7

Coating compositions were individually prepared in substantially the same manner as in Example 8, except that the blocked polyisocyanates prepared in Comparative Examples 2 and 3 were, respectively, used in these Comparative Examples 6 and 7 instead of the blocked polyisocyanate prepared in Example 1. Each of the prepared coating compositions was evaluated with respect to the gel ratio thereof in the same manner as in Example 8. Results are shown in Table 3.

REFERENCE EXAMPLE 8

(Production of an epoxy polyol)

A four-necked flask provided with a stirrer, a thermometer, a reflux condenser, a nitrogen gas feeding pipe and a dropping funnel was purged with nitrogen gas. 100 Parts by weight of bisphenol A type epoxy resin (AER6071, manufactured and sold by Asahi-Ciba, K.K. Japan; equivalent amount of epoxy group: 460) and 82 parts by weight of methyl isobutyl ketone were charged in the flask. To the resultant mixture was dropwise added 23 parts by weight of diethanolamine through the dropping funnel over 30 minutes, while maintaining the internal temperature of the flask at 90° C., to thereby effect a reaction. After the addition of diethanolamine, the flask was allowed to stand at 90° C. for 30 minutes. Then, the internal temperature of the flask was raised to 120° C., and this temperature was maintained for 1 hour. Thus, a solution of an epoxy polyol in methyl isobutyl ketone was obtained. The obtained epoxy polyol solution was analyzed according to the above-mentioned methods, and the analysis showed that the solids content of the epoxy polyol solution was 60% by weight, based on the weight of the solution, and the hydroxyl value of the solids (epoxy polyol) was 400 mg KOH/g.

EXAMPLE 15

(Evaluation of a coating composition obtained using epoxy polyol)

The epoxy polyol prepared in Reference Example 8 and the blocked polyisocyanate prepared in Example 1 were mixed with each other so that the equivalent ratio of the blocked isocyanate groups/hydroxyl groups of the epoxy polyol became 1:2, to obtain a mixture. To the mixture was added 0.5% by weight of dibutyltin dilaurate, based on the total weight of the solids in the mixture of the blocked polyisocyanate and epoxy polyol. The resultant mixture was diluted with methyl isobutyl ketone, so that the content of the solids became 25% by weight, to thereby obtain a coating composition. For evaluating the coating composition, the coating composition was coated onto a tin plate (size: 50 mm×150 mm) using an applicator, and dried at room temperature for 30 minutes to thereby obtain a coating. The obtained coating was baked at 120° C. for 30 minutes in an oven. With respect to the baked coating, the gel ratio was measured by the above-mentioned method. Results are shown in Table 3.

EXAMPLES 16 TO 21

Coating compositions were individually prepared in substantially the same manner as in Example 15, except that the blocked polyisocyanates prepared in Examples 2 to 7 were, respectively, used in these Examples 16 to 21 instead of the blocked polyisocyanate prepared in Example 1. Each of the prepared coating compositions was evaluated with respect to the gel ratio thereof in the same manner as in Example 15. Results are shown in Table 3.

COMPARATIVE EXAMPLES 8 AND 9

Coating compositions were individually prepared in substantially the same manner as in Example 15, except that the blocked polyisocyanates prepared in Comparative Examples 4 and 5 were, respectively, used in these Comparative Examples 8 and 9 instead of the blocked polyisocyanate prepared in Example 1. Each of the prepared coating compositions was evaluated with respect to the gel ratio thereof in the same manner as in Example 15. Results are shown in Table 3.

TABLE 3

Evaluation of One-Pack Type Urethane Coating Compositions

| | Main agent | Curing agent (prepared in Example or Comparative Example) | Gel ratio* of the prepared coating compositions |
|---|---|---|---|
| Example 8 | A801 | Example 1 | ⊚ |
| Example 9 | A801 | Example 2 | ⊚ |
| Example 10 | A801 | Example 3 | ⊚ |
| Example 11 | A801 | Example 4 | ⊚ |
| Example 12 | A801 | Example 5 | ⊚ |
| Example 13 | A801 | Example 6 | ⊚ |
| Example 14 | A801 | Example 7 | ⊚ |
| Comparative Example 6 | A801 | Comparative Example 2 | x |
| Comparative Example 7 | A801 | Comparative Example 3 | x |
| Example 15 | Epoxy | Example 1 | ○ |
| Example 16 | Epoxy | Example 2 | ○ |
| Example 17 | Epoxy | Example 3 | ○ |
| Example 18 | Epoxy | Example 4 | ○ |
| Example 19 | Epoxy | Example 5 | ○ |
| Example 20 | Epoxy | Example 6 | ○ |
| Example 21 | Epoxy | Example 7 | ○ |
| Comparative Example 8 | Epoxy | Comparative Example 4 | x |
| Comparative Example 9 | Epoxy | Comparative Example 5 | x |

The gel ratio was determined after curing at 120° C. for 30 minutes.

EXAMPLE 22
(Evaluation of impact resistance of coating composition obtained using polyester polyol)

The blocked polyisocyanate prepared in Example 4 and polyester polyol (Desmophen 670, manufactured and sold by Bayer Ltd., Germany) were mixed with each other, so that the blocked isocyanate groups/hydroxy groups equivalent ratio became 1:1, to obtain a mixture. To the mixture was added 0.5% by weight of dibutyltin dilaurate, based on the total weight of the solids in the mixture of the blocked polyisocyanate and the polyester polyol. The resultant mixture was diluted with the same mixture as used in Example 8, so that the content of the solids became 25% by weight, to thereby obtain a coating composition. For evaluating the impact resistance of the coating composition, the coating composition was sprayed onto a tin plate (size: 50 mm×150 mm), and dried at room temperature for 30 minutes, to thereby obtain a coating. The obtained coating was baked at 140° C. for 30 minutes in an oven. With respect to the baked coating, the impact resistance was evaluated by the above-mentioned method to give a degree of ○.

COMPARATIVE EXAMPLE 10

A coating composition was prepared in substantially the same manner as in Example 22, except that the blocked polyisocyanate prepared in Comparative Example 1 was used instead of the blocked polyisocyanate prepared in Example 4. The prepared coating composition was evaluated with respect to the impact resistance thereof in the same manner as Example 22, to give a degree of X.

EXAMPLE 23
(Production of adhesive property-imparting composition and evaluation of the appearance thereof, and production of plastisol composition using the adhesive property-imparting composition and evaluation thereof)

A four-necked flask provided with a stirrer, a thermometer, a reflux condenser, a nitrogen gas feeding pipe and a dropping funnel was purged with nitrogen gas. 100 parts by weight of the polyisocyanate prepared in Reference Example 1 and 133 parts by weight of dioctyl phthalate (DOP) were charged in the flask. To the resultant mixture was dropwise added methyl ethyl ketoxime (MEKoxime) through the dropping funnel, while maintaining the internal temperature of the flask at a temperature not exceeding 50° C., to thereby effect a reaction. The addition of MEKoxime was continued until an absorption peak characteristic of an isocyanate group in the infrared spectrum was no longer observed. Thus, an adhesive property-imparting composition having a solid content of 50% by weight was obtained. The appearance of the obtained adhesive property-imparting composition was evaluated.

For evaluating the adhesive property of the adhesive property-imparting composition, a plastisol composition was obtained, which is a mixture of 70 parts by weight of a straight polyvinyl chloride resin (Kanevinyl PSL-10, manufactured and sold by Kanegafuchi Chemical Industry Co. Ltd., Japan), 30 parts by weight of a vinyl chloride copolymer (Kanevinyl PCH-12, manufactured and sold by Kanegafuchi Chemical Industry Co. Ltd., Japan), 110 parts by weight of DOP, 150 parts by weight of calcium carbonate, 3 parts by weight of dibasic lead phosphate, and 3 parts by weight of the adhesive property-imparting composition. With respect to the obtained plastisol composition, the adhesive property was evaluated by the above-mentioned method. Results are shown in Table 4.

EXAMPLES 24 TO 29

Adhesive property-imparting compositions having a solids content of 50% by weight and plastisol compositions were individually prepared in substantially the same manner as in Example 23, except that the polyisocyanates prepared in Reference Examples 2 to 7 were, respectively, used in the Examples 24 to 29 instead of the polyisocyanate prepared in Reference Example 1. The blocking agents and solvents were used as shown in Table 4. With respect to each of the plastisol compositions, the adhesive property was evaluated by the above-mentioned method. Results are shown in Table 4.

EXAMPLE 30

A four-necked flask provided with a stirrer, a thermometer, a reflux condenser, a nitrogen gas feeding pipe and a dropping funnel was purged with nitrogen gas. 100 parts by weight of polyisocyanate prepared in Reference Example 1 and 187 parts by weight of DOP, 95 parts by weight of nonylphenyl and 0.0191 part by weight of dibutyltin dilaurate were charged in the flask. The internal temperature of the flask was maintained at 80° C. for 6 hours, to thereby obtain an adhesive property-imparting composition having a solids content of 50% by weight. A plastisol composition was prepared in the same manner as in Example 23, except that the above-obtained adhesive property-imparting composition was used instead of the adhesive property-imparting composition prepared in Example 23. With respect to the plastisol composition, the adhesive property was evaluated by the above-mentioned method. Results are shown in Table 4.

COMPARATIVE EXAMPLES 11 TO 13

Adhesive property-imparting compositions having a solids content of 50% and plastisol compositions were prepared in substantially the same manner as in Example 23, except that the polyisocyanates prepared in Comparative Reference Examples 2 to 4, were, respectively, used in the Comparative Examples 11 to 13 instead of the polyisocyanate prepared in Reference Example 1. With respect to each of the plastisol compositions, the adhesive property was evaluated by the above-mentioned method. Results are shown in Table 4.

TABLE 4

| | Materials for adhesive property-imparting compositions and evaluation thereof | | | | Evaluation of Plastisol compositions Adhesive Property |
|---|---|---|---|---|---|
| | Polyisocyanate Prepared in Reference Example or Comparative Example (parts by wt.) | Blocking agent (parts by wt:) | Solvent DOP (parts by wt.) | Appearance | |
| Example 23 | Reference Example 1 100 | MEKoxime 37 | 133 | Uniform & transparent | ○ |
| Example 24 | Reference Example 2 100 | MEKoxime 38 | 134 | Uniform & transparent | ○ |
| Example 25 | Reference Example 3 100 | MEKoxime 30 | 126 | Uniform & transparent | ○ |
| Example 26 | Reference Example 4 100 | MEKoxime 18 | 118 | Uniform & transparent | ○ |
| Example 27 | Reference Example 5 100 | MEKoxime 26 | 124 | Uniform & transparent | ○ |
| Example 28 | Reference Example 6 100 | MEKoxime 22 | 120 | Uniform & transparent | ○ |
| Example 29 | Reference Example 7 100 | MEKoxime 24 | 122 | Uniform & transparent | ○ |
| Example 30 | Reference Example 1 100 | Nonyl-phenyl 95 | 187 | Uniform & transparent | ○ |
| Comparative Example 11 | Comparative Reference Example 2 100 | MEKoxime 24 | 122 | Uniform & transparent | X |
| Comparative Example 12 | Comparative Reference Example 3 100 | MEKoxym 22 | 120 | Uniform & transparent | X |
| Comparative Example 13 | Comparative Reference Example 4 100 | MEKoxym 46 | 142 | Phase separation | not determined |

INDUSTRIAL APPLICABILITY

According to the present invention, there is provided a novel blocked polyisocyanate obtained by blocking the terminal isocyanate groups of a non-blocked polyisocyanate with a thermally dissociative blocking agent, wherein the non-blocked polyisocyanate is obtained by reacting at least one diisocyanate selected from the group consisting of an aliphatic diisocyanate and an alicyclic diisocyanate with a polyhydroxy compound having an average number of hydroxyl groups as many as 4.5 to 10, and removing substantially all unreacted diisocyanate monomers. The use of the blocked polyisocyanate of the present invention includes, for example, a coating composition comprising a polyol as a main agent and the blocked polyisocyanate as a curing agent; an adhesive property-imparting composition comprising the blocked polyisocyanate, and a plasticizer and/or a solvent which are/is for the blocked polyisocyanate; and a plastisol composition comprising a plastisol (which is a dispersion of a vinyl chloride polymer in a plasticizer), and the adhesive property-imparting composition. The coating composition comprising the blocked polyisocyanate of the present invention as a curing agent not only has excellent curability even under low temperature conditions, but is also capable of forming a coating which has excellent impact resistance. Therefore, the coating composition of the present invention can be advantageously used for coating a metallic substrate (such as a steel plate or a surface-treated steel plate) and a plastic substrate, by the technique of roll coating, curtain flow coating or the like. Especially, the coating composition of the present invention is useful as materials for undercoating, top coating and intercoating various substrates; a coating material for a precoated metal including a rust-resistant steel plate; and a coating material for imparting fine appearance, weatherability, acid resistance, rust resistance, mechanical strength (such as chipping resistance and impact resistance) and the like to automobiles. The blocked polyisocyanate of the present invention has excellent miscibility with a plasticizer for the blocked polyisocyanate, so that, an adhesive property-imparting composition comprising the blocked polyisocyanate and a plasticizer and/or a solvent can be combined with a plastisol to prepare a plastisol composition having excellent adhesive properties even under low temperature conditions. This plastisol composition can be advantageously used, for example, as sealants, materials for forming an undercoating and a chip-resistant coating, and a material for the preparation of a PVC-coated steel plate in the fields of automobiles, wherein the plastisol composition is applied to a substrate by the technique of spraying, brushing or the like.

What is claimed is:

1. A blocked polyisocyanate, which is substantially the same product as obtained by blocking 50 to 100% by mole of the terminal isocyanate groups of a non-blocked polyisocyanate with a thermally dissociative blocking agent, said non-blocked polyisocyanate being obtained by reacting at least one diisocyanate selected from the group consisting of an aliphatic diisocyanate and an alicyclic diisocyanate with a polyhydroxy compound having an average number of hydroxyl groups of from 4.5 to 10, and removing substantially all unreacted diisocyanate monomers, said non-blocked polyisocyanate having the following characteristics (a) to (d):
(a) a cyclic isocyanate trimer content of 10% or less, in terms of a ratio of the area of a peak ascribed to a cyclic isocyanate trimer, relative to the total area of all peaks ascribed to said non-blocked polyisocyanate in a gel permeation chromatogram thereof;
(b) an average number of terminal isocyanate groups of from 5 to 20;
(c) a number average molecular weight of from 1,200 to 10,000 as measured by gel permeation chromatography (GPC); and
(d) a terminal isocyanate group content of from 5 to 20% by weight, said blocked polyisocyanate having the following characteristics (e) to (g):
(e) an average number of blocked terminal isocyanate groups of from 5 to 20;
(f) a blocked terminal isocyanate group content of from 2 to 20% by weight; and
(g) a number average molecular weight of from 1,500 to 15,000 as measured by GPC.

2. The blocked polyisocyanate according to claim 1, wherein said polyhydroxy compound is selected from the group consisting of a polyether polyol, a polyester polyol and a mixture thereof.

3. The blocked polyisocyanate according to claim 2, wherein said polyhydroxy compound is a polyether polyol to which at least one organic oxide selected from the group consisting of alkylene oxides and phenylalkylene oxides is addition-bonded.

4. The blocked polyisocyanate according to claim 3, wherein said alkylene oxide is selected from ethylene oxide, propylene oxide, butylene oxide and cyclohexene oxide, and said phenylalkylene oxide is selected from styrene oxide and phenylpropylene oxide.

5. The blocked polyisocyanate according to claim 4, wherein said polyhydroxy compound is a polyether polyol to which propylene oxide is addition-bonded.

6. The blocked polyisocyanate according to claim 1, which has an allophanate bond in a molecule thereof.

7. The blocked polyisocyanate according to claim 1, wherein said thermally dissociative blocking agent is selected from the group consisting of an alkylphenol compound, an oxime compound, an acid amide compound, an active methylene compound and a mixture thereof.

8. A coating composition comprising:
(A) a polyol having a hydroxyl value of from 10 to 500 mg KOH/g, an acid value of from 0 to 200 mg KOH/g, and a number average molecular weight of from 300 to 60,000; and
(B) a blocked polyisocyanate of any one of claims 1 to 7.

9. The coating composition according to claim 8, wherein said polyol is selected from the group consisting of an aliphatic hydrocarbon polyol, a polyether polyol, a polyester polyol, an epoxy polyol, a fluoropolyol, an acrylic polyol and a mixture thereof.

10. An adhesive property-imparting composition comprising a blocked polyisocyanate of any one of claims 1 to 7 and at least one member selected from the group consisting of a plasticizer for said blocked polyisocyanate and a solvent for said blocked polyisocyanate.

11. A plastisol composition comprising a plastisol and an adhesive property-imparting composition of claim 10.

* * * * *